United States Patent [19]

Hayashi et al.

[11] Patent Number: 4,770,142

[45] Date of Patent: Sep. 13, 1988

[54] IGNITION TIMING CONTROL SYSTEM FOR INTERNAL COMBUSTION ENGINE

[75] Inventors: Tatsuo Hayashi; Kosuke Imoto, both of Wako, Japan

[73] Assignee: Honda Giken Kogyo Kabushiki Kaisha, Tokyo, Japan

[21] Appl. No.: 93,503

[22] Filed: Sep. 4, 1987

[30] Foreign Application Priority Data

Sep. 12, 1986 [JP] Japan .................................. 61-216803

[51] Int. Cl.$^4$ ................................................ F02P 9/00
[52] U.S. Cl. ............................ 123/424; 123/179 BG; 123/632
[58] Field of Search ................ 123/424, 179 BG, 418, 123/632, 630, 198 DC, 176.5 D

[56] References Cited

U.S. PATENT DOCUMENTS 4,088,106  5/1978  Borst et al. .......................... 123/418
4,364,344 12/1982  Buetemeister ....................... 123/424

FOREIGN PATENT DOCUMENTS 55-107069  8/1980  Japan .

Primary Examiner—Andrew M. Dolinar
Attorney, Agent, or Firm—Lahive & Cockfield

[57] ABSTRACT

An ignition timing control system for an internal combustion engine cuts the ignition when the engine rotational speed is below a threshold speed indicative of stall. On starting, the threshold speed is set low. The engine speed is monitored, and a higher threshhold is set when the engine has attained a speed indicative of full combustion.

5 Claims, 4 Drawing Sheets

IGNITION TIMING CONTROL SYSTEM FOR INTERNAL COMBUSTION ENGINE

BACKGROUND OF THE INVENTION

The present invention relates to an ignition timing control system in an ignition device for an internal combustion engine.

One ignition device for igniting an internal combustion engine is disclosed in the Japanese patent application publication No. 55-107069 (No. 107069/1980). In this ignition device, a technology is disclosed in which ignition timing is determined based on inspection of a pulse train synchronized with revolution of the engine. When pulse distance of the pulse train becomes above a required time, engine stall, that is, the engine stop is judged to have occurred and the ignition operation is cut.

In determining engine stall of such a prior art device, the required length of time mentioned above is not capable of setting to be shorter for avoiding a misjudgment which considers a low speed revolution of the engine upon its start as an engine stall. In other words, the engine stall is not detected until immediately before the revolution of the engine stops whereby the ignition interrupt (referred hereinafter to "the ignition cut") is delayed. Consequently, there is a danger of generating a reverse torque by an ignition effected on reverse.

SUMMARY OF THE INVENTION

Accordingly, it is an object of the present invention to provide an ignition timing control system for an internal combustion engine which prevents the generation of a reverse torque.

In the ignition timing control system for an internal combustion engine according to the present invention, engine stall is detected by comparing a distance of a pulse train generated in synchronism with revolution of the engine with a stop discriminating value. Once the engine has passed its full explosion following the so called cranking condition immediately after starting the engine, said stop discriminating value is increased to be capable of early detecting a tendency of engine stall.

DETAILED DESCRIPTION OF ILLUSTRATED EMBODIMENT

An embodiment of the present invention will be described in detail below by referring to the accompanying drawings.

Figure 1:
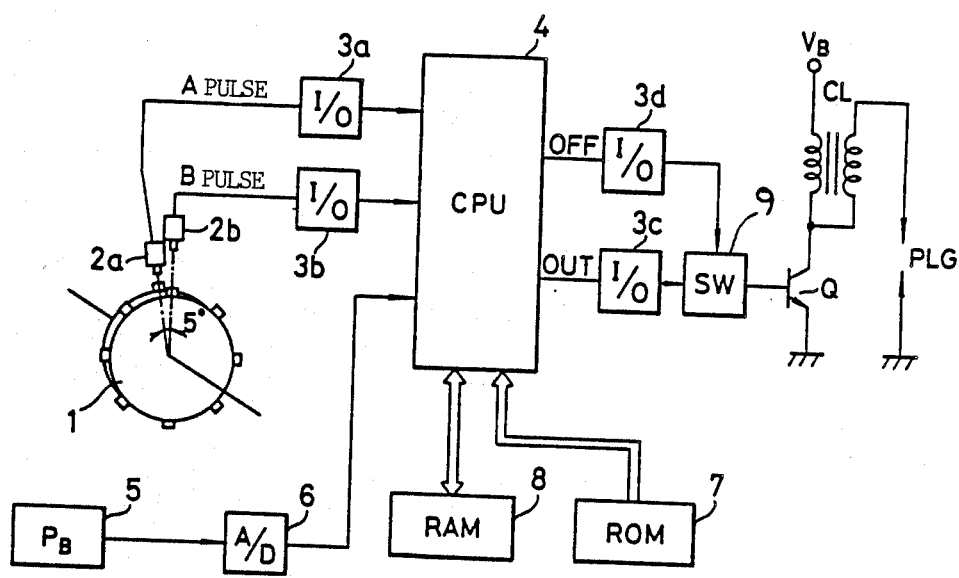
FIG. 1 is a block diagram of an ignition timing setting system according to the present invention.

FIG. 1 shows an ignition device for ignition timing control according to the present invention. In this ignition device are included pulse generators $2a$ and $2b$ which cooperate with a rotary body 1 which rotates in synchronism with the revolution of the engine, such as a crank shaft of the engine (not shown) carried on the vehicle. The generators $2a$, $2b$ generate an A pulse train and B pulse train. These pulse trains are supplied to input/output ports of CPU 4 of a microcomputer after wave shaping or level adjustment via interface circuits $3a$, $3b$. In addition, a signal $P_B$ showing a negative pressure of the intake manifold of the engine is supplied from a vacuum sensor, $P_B$ sensor 5, to an A/D converter 6. For example, a $P_B$ data signal of 6 bits is supplied to the CPU 4. The latter synchronizes with a clock pulse of a clock source (not shown) and performs an operating function according to a program stored in a ROM 7 or a RAM 8 in correspondence with the A pulse, the B pulse and the $P_B$ data to set a conducting start timing and a current interrupting timing. In these timings, outputs of a logic "1" and a logic "0" are supplied to a switch 9 denoted SW from an output port denoted OUT through an interface circuit $3c$. Also, when the CPU 4 has determined to cut the ignition, a logic "1" signal for turning off the switch SW 9 is supplied from an OFF port to a control terminal of the switch SW through the interface circuit $3d$. The switching element 9 has its output connected to switching transistor Q. When the logic "1" signal (ON signal) of the output of the switch SW is supplied to the base of transistor Q, the latter becomes conductive and a current flows in the primary winding of an ignition coil, denoted CL. When the logic "0" signal (OFF signal) is supplied to the base of the transistor Q, the latter becomes non-conductive, and a high voltage is generated in the secondary winding of the ignition coil. An arc is generated at a gap of an ignition plug, denoted PLG, by the high voltage to ignite the engine.

Figure 2:
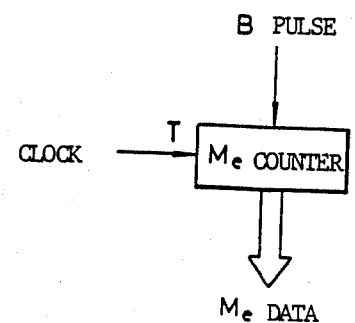
FIG. 2 is a block diagram of a counter included in a CPU 4 in the ignition device of FIG. 1.

The following description of FIGS. 2, $3a$ and $3b$ illustrates the operation of the CPU 4.

In the CPU 4 is self-contained a counter denoted the Me counter (FIG. 2) which counts clock pulses starting with the front edge of the B pulse, and which is cleared at rear edge portion of the B pulse. The counting value thus indicates the pulse width of the B pulse from its front edge position of the B pulse. The count value is equal to the inverse of the instantaneous value of the engine RPM, denoted Ne, and becomes data showing $Me = 1/Ne$.

Figure 3:
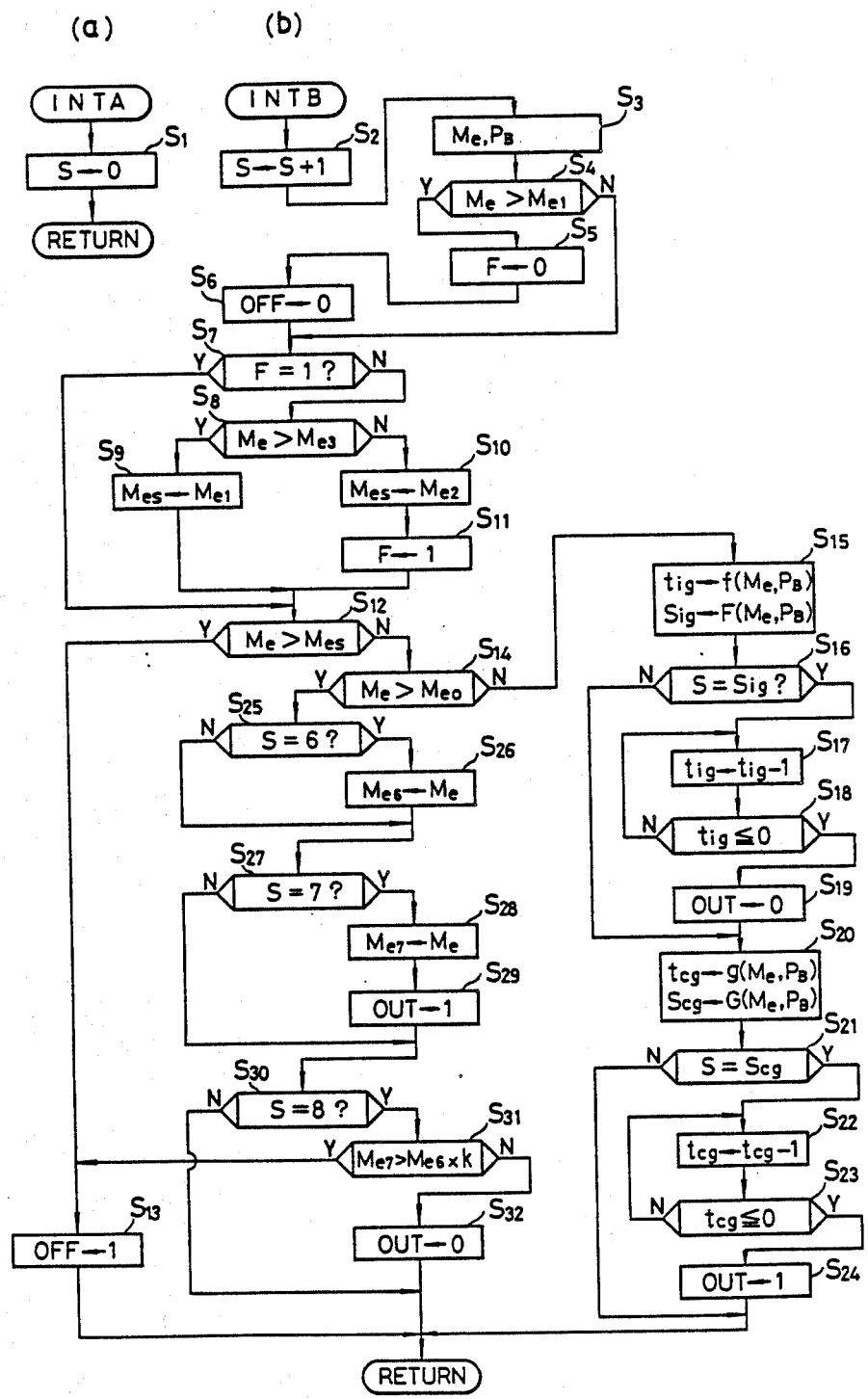
FIGS. 3(a) and (b) are flow charts showing operation of the CPU.

The CPU 4 commands the conducting start and interrupt, as well as the ignition cut according to flow charts shown in FIGS. 3 $(a)$, $3(b)$. That is, in a sub-routine of FIG. 3($a$), a self-contained stage counter is reset with each occurrence of the A pulse (step $S_1$). A sub-routine shown in FIG. 3($b$) is performed with each occurrence of the B pulse whereby the counting value of the stage counter is increased by one (step $S_2$). In this subroutine the data Me, $P_B$, are inspected (step S3) and the magnitude of Me is compared to a threshhold Me, (step S4). Here, the $Me_1$ is the inverse number of a revolution number $Ne_1$ which is taken as indicative of an engine stall condition for discriminating an initial stall. The threshhold stall RPM may be preset for example, to an order of 84 r.p.m. If $Me > Me_1$, then the revolution number of the engine is lower than $Ne_1$, and a flag F and OFF are each reset to zero (steps $S_5$, $S_6$). If $Me < Me_1$, the subroutine proceeds to the following step.

Next, it is determined whether $F=1$ or not (step $S_7$), and when the flag is not equal to 1, that is, when $F=0$, Me and $Me_3$ are compared (Step $S_8$). Here, the $Me_3$ is the inverse number of a second preset revolution number, for example, of an order 800 r.p.m. for judging a full explosion. If $Me > Me_3$, a threshhold value Mes is made equal to $Me_1$ (step $S_9$), and if $Me < Me_3$, the threshhold value Mes is made equal to $Me_2$ and the flag F is set to 1 (step $S_{10}$, $S_{11}$). Here, the $Me_2$ is the reciprocal of an intermediate engine RPM, $Ne_2$ of an order of 400 r.p.m., for example, for discriminating the occurrence of stall after attaining full explosion.

Then, the values of Me and Mes are compared in magnitude (step $S_{12}$). When Me is larger than Mes, it is equivalent to the revolution number Ne of the engine being smaller than $Ne_1$ or $Ne_2$, and it is judged to have generated an engine stall. In the case, the OFF output is set to "1" (step $S_{13}$) and the processor enters into a return operation. If Me≦Mes, then Me and Meo are compared in magnitude (step $S_{14}$). Here, the value of Meo is equal to the reciprocal of an engine RPM, for example, on the order of 500 r.p.m. If Me≦Meo, the engine is judged to be in a normal driving condition and therefore it enters into ignition timing setting operation as follows. First, there are set an ignition stage count value for rough setting of the ignition timing Sig and an interrupting trigger count value tig for fine setting by considering them to be equal to function values F(Me, $P_B$) and f(Me, $P_B$) (step $S_{15}$). The function values F(Me, $P_B$) and f(Me, $P_B$) are preferably prestored in the ROM or the RAM as map values.

Next, it is judged whether the stage count value S is equal to the Sig or not (step $S_{16}$). If S is equal to Sig, the crank angle approaches an ignition angle, and the interrupting trigger count tig is decreased by one (step $S_{17}$). The decrement is continued as long as tig>0 by comparing the value of tig with zero (step $S_{18}$) and decrementing tig by one. When tig≦0, the ignition timing comes up and consequently the interrupt command OUT=0 is generated (step $S_{19}$).

On the one hand, when S is not equal to Sig, it enters into a process which determines the conducting start timing which starts the flow of current in the ignition coil before ignition. First, conducting start stage count value Scg and a conducting start trigger count value tcg are each determined by function values G (Me, $P_B$) and g (Me, $P_B$) (step $S_{20}$). Then, when comparing the stage count value S and Scg (step $S_{21}$), if they are equal to each other, this indicates having reached the conducting start stage, and the value of tcg is decreased one by one until it becomes zero or negative. If tcg≦0, this indicates having reached the conducting timing, and the OUT output becomes 1 which initiates the flow of current in the ignition coil C1 (step $S_{24}$) thereby to enter into the return function.

On the other hand, in the step $S_{14}$, if Me>Meo, then Meo<Me<Mes and the engine RPM is in a range of $Ne_1$ or $Ne_2$<Ne<Neo. That is, the engine RPM is above both stall threshholds, but less than the RPM indicative of full combustion. In this case, the following fixed ignition is made. Then, it is judged whether the stage count value S is equal to 6 or not, and if S=6, the Me is considered as $Me_6$ i.e., the number of clock pulses accumulated in the B counter between the leading and trailing edges of the 6th B pulse, which is a number inversely proportional to engine speed at that instant. Next, when the stage count value S is equal to 7, the Me is considered as $Me_7$ (step $S_{28}$). After this, as OUT=1 (step $S_{29}$), the conducting command is emitted. Then, S=8 is judged and if S=8, it is determined whether $Me_7 > Me_6$ K (for example, K=1.2−2.0) (step $S_{31}$). $Me_7 > Me_6$ K indicates that the revolution number of the engine is largely changing. Then the engine is judged to be in its inconstant condition and the processor enters into the step $S_{13}$ which performs the ignition cut. When $Me_7 ≧ Me_6$, as OUT=0, the command is emitted to interrupt the condition of the coil current (step $S_{32}$) and it enters into the return function after ignition.

Figure 4:
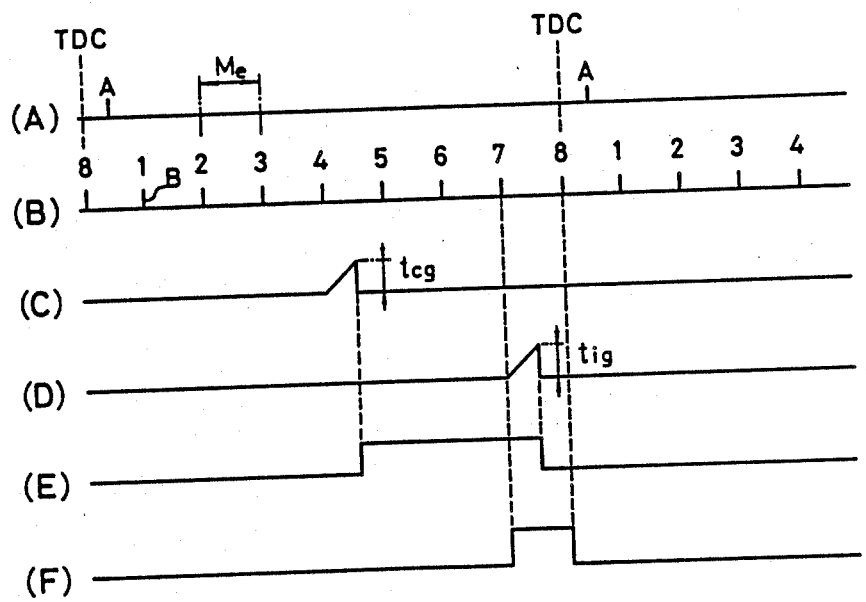
FIG. 4 is a wave form chart showing the operation of the CPU.

FIG. 4 is a wave form chart of signals showing the operation of the above mentioned CPU 4. FIG. 4 lines A and B show the A pulse and the B pulse. That is, the A pulse is generated after TDC before generation of the first B pulse and the B pulse is generated at 8 equal distance intervals during a period from a first TDC to a second TDC. That is, the pulse distance of the B pulse is 45°. Here, it is understood that the number of the B pulse and the stage count value discussed above correspond to each other. In the case illustrated in FIG. 4, line C, the conducting start stage Scg is 4 and the coil starts to conduct at a time when the decrement of the tcg has finished. The ignition stage count value Sig is 7 (FIG. 4 line E) and the conducting of coil is interrupted at a time when the decrement of the value of tig starting from S=7 has finished and the ignition is performed (FIG. 4, lines D, E).

On the other hand, when fixed ignition steps $S_{25}$, $S_{32}$ are performed, the current flows to the ignition coil during when the stage count is between 7 and 8 (FIG. 4, line F), and the ignition is performed when the current of the ignition coil is interrupted.

Figure 5:
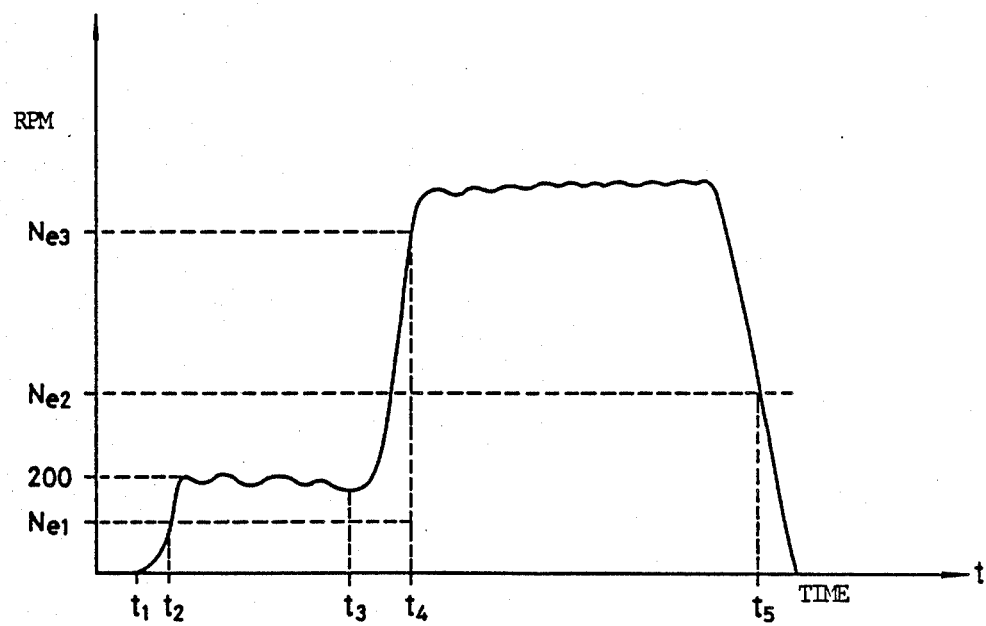
FIG. 5 is a graph showing revolution number of the engine following starting.

FIG. 5 illustrates the revolution number of the engine changing when starting the engine. When a starter motor starts at a time $t_1$ the revolution number of Ne of the engine exceeds $Ne_1$ at a time $t_2$ and a cranking rotation of an order of 200 r.p.m. continues, and the explosion stroke starts in an engine cylinder at the time $t_3$. By this the revolution number of the engine raises at once and attains full explosion at a time $t_4$. As a result of this, the revolution number, Ne, of the engine exceeds $Ne_3$ and an idle revolution is continued for some time. But, under a condition, such as cooled engine or the like, the Ne rapidly drops due to an accidental fire of the engine and the Ne falls below $Ne_2$ at time $t_5$. This is determined to be an engine stall.

That is, the engine stall is determined to have occurred when the Ne is below the Ne before the full explosion of the engine and also is discriminated when the Ne is below the $Ne_2$ after the full explosion.

Further, in the above embodiment, the step $S_{14}$ can abbreviate and go to the step $S_{25}$, and also the fixed ignition function step $S_{32}$ can abbreviate. When the tig, Sig, tcg and Scg are set for setting the ignition timing, the setting can be made only by the Me without dependence on the parameter $P_B$.

EFFECT OF THE INVENTION

As apparent from the above description in an ignition timing control system according to the present invention, when the discrimination of engine stall is made upon starting the engine, full explosion of the engine is detected by the increase of the revolution number of the engine and a discriminating threshhold value is set to a higher revolution number after the full explosion. Accordingly, the engine is capable of obtaining good idling performance, and also the discrimination of engine stall can be positively made on the basis of the revolution of the crank angle.

We claim:
1. An ignition timing control system for an internal combustion engine wherein ignition is commanded at an ignition timing corresponding to a driving condition of the engine as far as revolution numbers of the engine are over a required revolution number indicative of stall and the ignition is cut when the revolution numbers of the engine are below said required revolution number indicative of stall, characterized in that on starting the engine, said required revolution number of the engine is set to a first number, and then is set to a higher number for discriminating the stall after once attaining a revolution number indicative of full explosion.

2. An ignition timing control system for an internal combustion engine wherein the ignition is controlled to occur at an ignition timing corresponding to a driving condition of the engine when the RPM of the engine exceeds a certain cut off RPM number indicative of a stall threshhold and the ignition is cut when the RPM of the engine is below said cutoff RPM characterized in that said cut off RPM is a variable threshhold, such that on starting the engine, said cut off RPM, is set to be lower than the cutoff RPM is set after the engine has once attained a revolution number indicative of full explosion.

3. An ignition timing control system according to claim 2 further comprising means for sensing said driving condition, such means for sensing comprising at least one of an intake pressure sensor and an engine rotational speed sensor.

4. An ignition timing control system of the type wherein the ignition is disabled when the engine RPM is below a cutoff RPM number indicative of engine stall, such system comprising means for sensing engine RPM including means for developing a pulse train in synchrony with rotation of the engine, means for setting a current threshhold RPM to a first number upon starting of the engine and to a second higher number following full combustion, comparing means for comparing the sensed engine RPM to the current threshhold RPM, and cut-out means for cutting the ignition when said comparing means determines the engine RPM is below said current threshhold RPM whereby said cut-out means is operative at a higher threshhold RPM following full combustion then upon start-up.

5. An ignition timing control system according to claim 4, further comprising vacuum sensing means for sensing engine intake vacuum and providing a vacuum signal indicative thereof, and ignition timing means, operative on the pulse train and the vacuum signal for determining ignition timing.

* * * * *